(12) United States Patent
Izumi (10) Patent No.: US 10,539,988 B2
(45) Date of Patent: Jan. 21, 2020

(54) MEMORY SYSTEM

(71) Applicant: TOSHIBA MEMORY CORPORATION, Tokyo (JP)

(72) Inventor: Shinya Izumi, Fujisawa Kanagawa (JP)

(73) Assignee: Toshiba Memory Corporation, Tokyo (JP)

( * ) Notice: Subject to any disclaimer, the term of this patent is extended or adjusted under 35 U.S.C. 154(b) by 5 days.

(21) Appl. No.: 15/991,126

(22) Filed: May 29, 2018

(65) Prior Publication Data

US 2019/0073007 A1    Mar. 7, 2019

(30) Foreign Application Priority Data

Sep. 5, 2017   (JP) ................. 2017-170617

(51) Int. Cl.
  *G06F 3/06*     (2006.01)
  *G06F 1/20*     (2006.01)
  *G06F 12/02*    (2006.01)
  *G06F 11/30*    (2006.01)

(52) U.S. Cl.
  CPC ............ *G06F 1/206* (2013.01); *G06F 3/0614* (2013.01); *G06F 3/0616* (2013.01); *G06F 3/0634* (2013.01); *G06F 3/0653* (2013.01); *G06F 3/0656* (2013.01); *G06F 3/0659* (2013.01); *G06F 3/0679* (2013.01); *G06F 3/0688* (2013.01); *G06F 12/0246* (2013.01); *G06F 3/067* (2013.01); *G06F 11/3034* (2013.01); *G06F 11/3058* (2013.01); *G06F 2201/81* (2013.01)

(58) Field of Classification Search
  None
  See application file for complete search history.

(56) References Cited

U.S. PATENT DOCUMENTS

| | | |
|---|---|---|
| 9,183,000 B2 | 11/2015 | Ichida et al. |
| 9,594,611 B2 | 3/2017 | Hashimoto |
| 2016/0117105 A1* | 4/2016 | Thangaraj ............ G06F 3/0616 711/103 |
| 2016/0365138 A1* | 12/2016 | Cho ................... G11C 11/40626 |
| 2017/0030777 A1 | 2/2017 | Kimura et al. |

FOREIGN PATENT DOCUMENTS

| | | |
|---|---|---|
| JP | 2013-50818 A | 3/2013 |
| JP | 5668163 B2 | 2/2015 |
| JP | 2017-27541 A | 2/2017 |

* cited by examiner

*Primary Examiner* — Brian R Peugh
(74) *Attorney, Agent, or Firm* — Kim & Stewart LLP (57) ABSTRACT

A memory system includes a nonvolatile memory, a temperature sensor, and a controller. The controller is configured to acquire a number of target commands that are queued for execution and a temperature detected by the temperature sensor, and set control parameters that affect performance of the memory system according to the acquired number of target commands and the acquired temperature.

20 Claims, 10 Drawing Sheets

| NUMBER OF COMMANDS \ TEMPERATURE | 50°C | 60°C | 70°C | 80°C |
|---|---|---|---|---|
| 0 | 0 | 1 | 2 | 3 |
| 1 | 0 | 1 | 2 | 3 |
| 2 | 1 | 2 | 3 | 3 |
| 3 | 1 | 2 | 3 | 4 |

| NUMBER OF COMMANDS \ TEMPERATURE | 50°C | 60°C | 70°C | 80°C |
|---|---|---|---|---|
| 0 | 45°C | 55°C | 65°C | 75°C |
| 1 | 45°C | 55°C | 65°C | 75°C |
| 2 | 45°C | 55°C | 65°C | 75°C |
| 3 | 45°C | 55°C | 65°C | 75°C |

| NUMBER OF COMMANDS / TEMPERATURE | 50°C | 60°C | 70°C | 80°C |
|---|---|---|---|---|
| 0 | 40°C | 50°C | 60°C | 70°C |
| 1 | 40°C | 50°C | 60°C | 70°C |
| 2 | 40°C | 50°C | 60°C | 70°C |
| 3 | 40°C | 50°C | 60°C | 70°C |

MEMORY SYSTEM

CROSS-REFERENCE TO RELATED APPLICATION

This application is based upon and claims the benefit of priority from Japanese Patent Application No. 2017-170617, filed Sep. 5, 2017, the entire contents of which are incorporated herein by reference.

FIELD

Embodiments described herein relate generally to a memory system.

BACKGROUND

A memory system including a nonvolatile memory is known. If a temperature of the memory system becomes too high, performance of the memory system may deteriorate or the memory system may be damaged.

DETAILED DESCRIPTION

In general, according to one embodiment, a memory system includes a nonvolatile memory, a temperature sensor, and a controller. The controller is configured to acquire a number of target commands that are queued for execution and a temperature detected by the temperature sensor, and set control parameters that affect performance of the memory system according to the acquired number of target commands and the acquired temperature.

Hereinafter, a memory system according to embodiments will be described in detail with reference to the accompanying drawings. The embodiments of the present disclosure are examples and are not intended to be limiting.

First Embodiment

Figure 1:
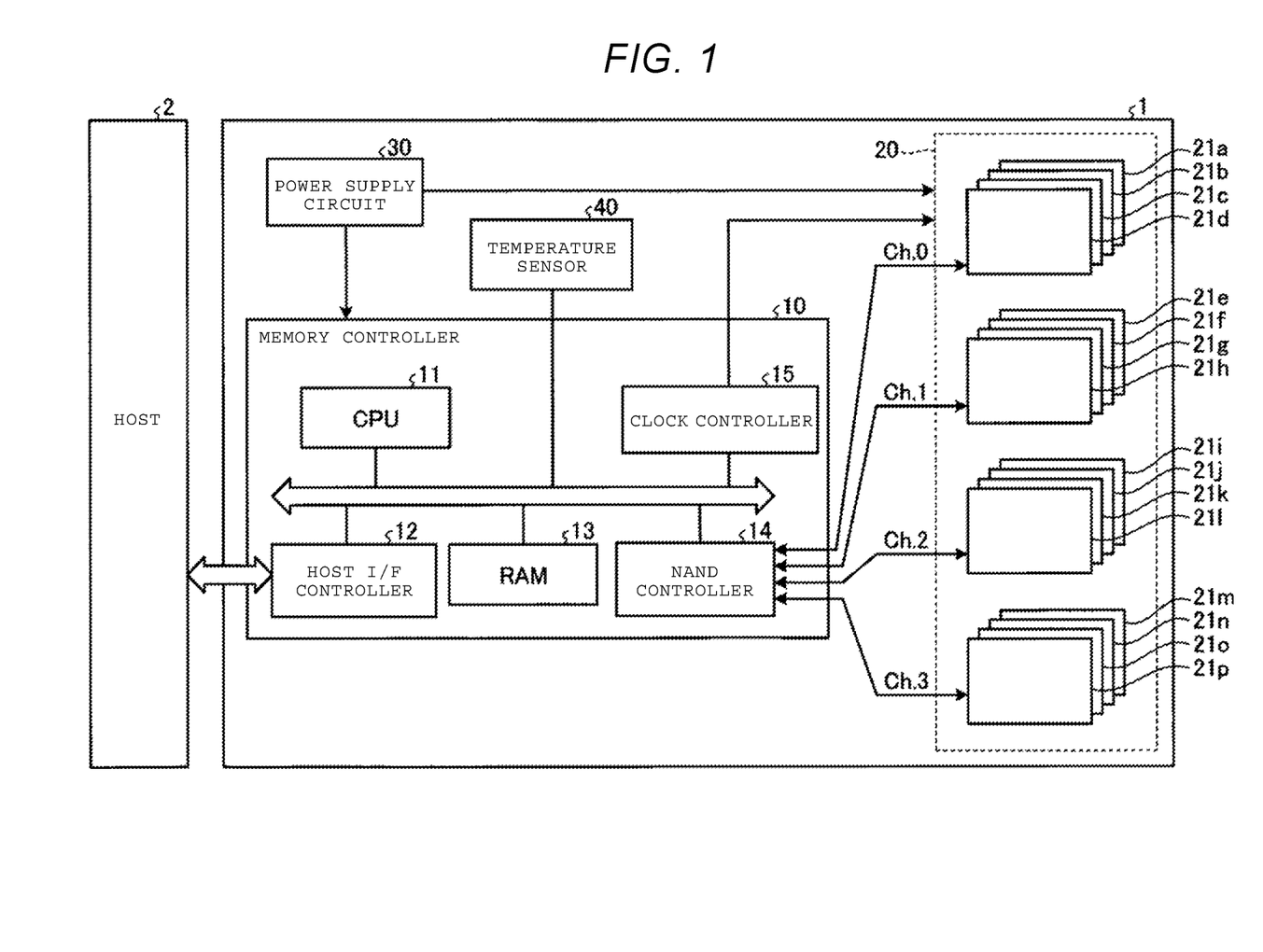
FIG. 1 is a diagram illustrating a configuration of a memory system according to a first embodiment.

FIG. 1 is a diagram illustrating a configuration of a memory system according to a first embodiment. The memory system 1 is connectable to a host 2. The standard employed for the communication interface between the memory system 1 and the host 2 is not limited to a specified standard. In one example, serial attached SCSI (SAS) may be employed.

The host 2 corresponds to, for example, a personal computer, a portable information terminal, a server, or the like. The memory system 1 may receive access commands (e.g., a read command and a write command) from the host 2. Each access command includes a logical address indicating an access destination. The logical address indicates a location within a logical address space that the memory system 1 provides to the host 2.

The memory system 1 includes a memory controller 10, a NAND flash memory (NAND memory) 20, a power supply circuit 30, and a temperature sensor 40.

The NAND memory 20 is configured with one or more memory chips 21. Here, the NAND memory 20 includes 16 memory chips 21a to 21p as the one or more memory chips 21.

Each of the sixteen memory chips 21 is connected to the memory controller 10 via one of four channels (ch.0 to ch.3). According to the example of FIG. 1, the memory chips 21a to 21d are connected to a channel 0 (ch.0). The memory chips 21e to 21h are connected to a channel 1 (ch.1). The memory chips 21i to 21l are connected to a channel 2 (ch.2). The memory chips 21m to 21p are connected to a channel 3 (ch.3).

Each channel includes an I/O signal line and a control signal line. For example, the I/O signal line is used to transmit and receive data, an address, and a command. The control signal line is used to transmit and receive a write enable (WE) signal, a read enable (RE) signal, a command latch enable (CLE) signal, an address latch enable (ALE) signal, a write protect (WP), and the like.

The memory controller 10 may independently control the respective channels. By simultaneously controlling the four channels, the memory controller 10 may simultaneously operate a total of four memory chips 21, each connected to a different channel.

The number of channels provided in the memory system 1 is not limited to four. In addition, the number of the memory chips 21 connected to each channel is not limited to four.

Each memory chip 21 includes a memory cell array that provides storage regions of the NAND memory 20. The memory cell array stores data received from the host 2 and data (firmware program, management information, and the like) required for an operation of the memory system 1.

Any type of nonvolatile memory may be adopted in the memory system 1. For example, a NOR flash memory, a magnetoresistive random access memory (MRAM), a resistive random access memory (ReRAM), or a phase change random access memory (PCM) may be adopted.

The power supply circuit 30 generates internal power for driving the memory controller 10 and the NAND memory 20, and supplies the generated internal power to each of the memory controller 10 and the NAND memory 20.

The temperature sensor 40 detects a temperature of the memory system 1 and sends the detected temperature to the memory controller 10.

A plurality of electronic components such as the memory controller 10, the NAND memory 20, and the power supply circuit 30 are mounted in the memory system 1, and each of temperatures varies depending on an operation state of the memory system 1 and a load of each electronic component. Thus, strictly speaking, temperatures of the memory system 1 are not uniform. Thus, in the embodiment, the temperature of the memory system 1 is defined as a temperature detected at a location where the temperature sensor 40 is provided. In one example, the temperature sensor 40 is provided around an electronic component, which generally has a high temperature, such as the NAND memory 20 or the memory controller 10. The temperature sensor 40 detects a temperature corresponding to the temperature of the electronic component which generally has a high temperature as a temperature of the memory system 1.

The number of the temperature sensors 40 provided in the memory system 1 is not limited to a specified number. If a plurality of temperature sensors 40 are provided in the memory system 1, the memory controller 10 performs predetermined calculations (for example, averaging, extraction of a maximum value) for a plurality of detected temperatures obtained by different temperature sensors 40, and a value obtained by the calculation may be used as the detected temperature.

The memory controller 10 controls the entire memory system 1 by cooperating with the respective components in the memory system. For example, the memory controller 10 performs data transfer between the host 2 and the NAND memory 20 via a data buffer 132 which will be described later.

The memory controller 10 includes a central processing unit (CPU) 11, a host interface controller (host I/F controller) 12, a RAM 13, a NAND controller 14, and a clock controller 15. The memory controller 10 may be configured as, for example, system-on-a-chip (SoC). The memory controller 10 may be configured with a plurality of chips.

The RAM 13 functions as a cache, a buffer, and a working area. For example, the RAM 13 is configured with a dynamic random access memory (DRAM), a static random access memory (SRAM), or a combination thereof. The RAM 13 may be provided outside the memory controller 10.

Figure 2:
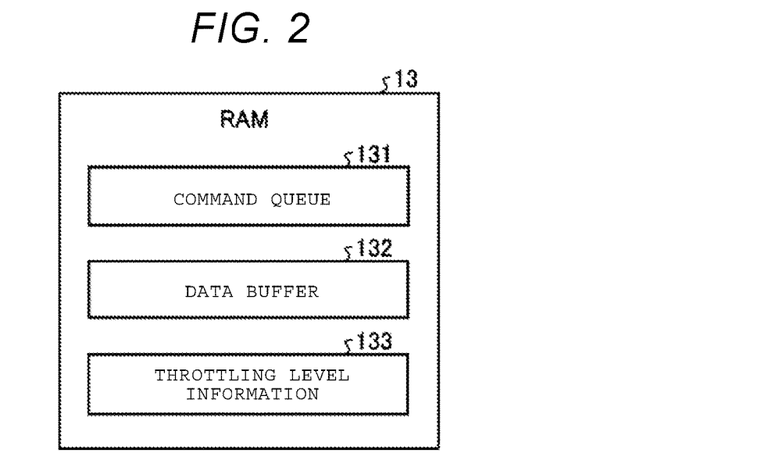
FIG. 2 is a diagram illustrating a configuration of a RAM in the memory system according to the first embodiment.

FIG. 2 is a diagram illustrating a configuration of the RAM 13 in the first embodiment. As illustrated in the figure, the RAM 13 includes a command queue 131 and a data buffer 132.

The command queue 131 stores access commands received from the host 2. The access commands stored in the command queue 131 are sequentially executed. When execution of the access command is completed, the access command is removed from the command queue 131.

The data buffer 132 stores data received from the host 2 and data read from the NAND memory 20. The data received from the host 2 and stored in the data buffer 132 is written to the NAND memory 20 at a predetermined timing. In addition, the data read from the NAND memory 20 and stored in the data buffer 132 is transmitted to the host 2 at a predetermined timing. The data buffer 132 may be divided into a region to which the data received from the host 2 is stored and a region to which the data read from the NAND memory 20 is stored. In addition, the data buffer 132 may be configured as a cache.

In addition, the RAM 13 stores throttling level information 133. Details of the throttling level information 133 will be described later.

Referring back to FIG. 1, the host interface controller 12 controls communication of information (such as command and data) between the host 2 and the memory controller 10. For example, the host interface controller 12 writes an access command received from the host 2 to the command queue 131. In addition, when processing corresponding to the access command is completed, the host interface controller 12 removes the access command from the command queue 131.

In addition, the host interface controller 12 writes data received from the host 2 to the data buffer 132. In addition, the host interface controller 12 transmits data read from the NAND memory 20 and stored in the data buffer 132 to the host 2.

Under control of the CPU 11, the NAND controller 14 accesses the NAND memory 20. For example, the NAND controller 14 writes the data stored in the data buffer 132 to the NAND memory 20, reads the data stored in the NAND memory 20, and stores the read data in the data buffer 132.

The clock controller 15 generates clocks for operating each component of the memory controller 10 and the NAND memory 20. The clock controller 15 supplies the generated clocks to each component and the NAND memory 20.

The CPU 11 is a processor that operates based on a program (firmware program) stored in the memory system 1 in advance. The firmware program is stored in, for example, a predetermined location of the NAND memory 20. When the memory system 1 starts, the CPU 11 loads the firmware program from the NAND memory 20 into the RAM 13. The CPU 11 executes the firmware program loaded in the RAM 13. The CPU 11 realizes various functions of the memory controller 10 in accordance with the firmware program.

Here, one feature of the embodiment will be described. According to the embodiment, to prevent a temperature of the memory system 1 from becoming too high, the memory controller 10 reduces performance of the memory system 1 in accordance with the detected temperature, which is received from the temperature sensor 40, and a status of reception of the access command from the host 2. The reduction of the performance is to control the performance of the memory system 1 to be below the highest performance. If the performance of the memory system 1 is reduced, power consumption of some or all of the electronic components provided in the memory system 1 is reduced, and the amount of heat generated by the electronic components is reduced. The memory controller 10 gradually adjusts the performance of the memory system 1, so that the temperature of the memory system 1 does not become too high.

As one example, the memory controller 10 uses the number of commands stored in the command queue 131 as information indicating the status of reception of the access command. Under a condition that the detected temperature is the same, the memory controller 10 reduces the amount of reduction as the number of commands stored in the command queue 131 decreases.

If the number of commands stored in the command queue 131 is small, the total amount of heat generated during processing of the commands is small. In addition, it is expected that the temperature of the memory system 1 decreases after processing of the commands is completed. That is, if the number of commands stored in the command queue 131 is small, it is possible to prevent an increase in temperature without reducing the performance of the memory system 1. Thus, if the number of commands stored in the command queue 131 is small, the memory controller 10 reduces the amount of reduction of the performance of the memory system 1 as compared with a case where the number of commands stored in the command queue 131 is large. Thereby, it is possible to limit increases in latency which would result by reduction of performance.

If the number of commands stored in the command queue 131 is large, the total amount of heat generated during processing of the commands is large, and time taken to process the commands is long. Thus, if the performance of the memory system 1 is not reduced, the temperature of the memory system 1 increases. If the number of commands stored in the command queue 131 is large, the memory controller 10 increases the amount of the reduction of the performance of the memory system 1 in order to prevent an increase in temperature of the memory system 1.

In addition, under a condition where the number of commands stored in the command queue 131 is the same, the memory controller 10 increases the amount of reduction as the detected temperature increases.

A method of reducing the performance of the memory system 1 is not limited to a specified method. In one example, the memory controller 10 instructs the clock controller 15 to lower a frequency of the clock supplied to each electronic component. The memory controller 10 may lower the frequency of the clock for operating the memory controller 10 or may lower the frequency of the clock for operating the NAND memory 20. In the electronic component to which the clock is supplied, the frequency of the supplied clock is lowered, and thereby, an operation speed decreases and the performance of the memory system 1 is reduced. The lower the frequency of the clock supplied to the electronic component is, the greater the amount of reduction of the performance of the memory system 1 is.

In another example, the memory controller 10 reduces the performance of the memory system 1 by reducing the number of parallel operations of the NAND memory 20. According to the example of FIG. 1, the memory controller 10 can operate four memory chips 21 connected to different channels in parallel by simultaneously controlling the four channels. By reducing the number of simultaneously controlled channels, for example, from four to one, two, or three, the memory controller 10 can reduce the number of memory chips 21 that can be operated in parallel. Since the number of simultaneously controlled channels decreases and thereby the number of memory chips 21 accessed in parallel decreases, performance of the memory system 1 is reduced. The smaller the number of parallel operations of the NAND memory 20 is, the greater the amount of reduction of the performance of the memory system 1 becomes.

The number of parallel operations is not limited to the number of channels simultaneously controlled. The memory controller 10 may reduce the performance of the memory system by stopping bank interleaving. According to bank interleaving, one bank is configured with a plurality of memory chips 21 in different channels. For example, the four memory chips 21a, 21e, 21i, and 21m form one bank, and the four memory chips 21b, 21f, 21j, and 21n form another bank. The memory controller 10 can transmit and receive data or a command to and from one bank while accessing another bank. As such, the memory controller 10 can simultaneously operate the plurality of memory chips 21 belonging to the same channel by bank interleaving. That is, bank interleaving is one of parallel operation methods in which each bank is a parallel operation element. As the memory controller 10 stops bank interleaving, the number of memory chips 21 that can be simultaneously operated is reduced, and the amount of reduction of the performance of the memory system 1 increases.

In yet another example, if a plurality of consecutive accesses to the NAND memory 20 is performed, the memory controller 10 inserts a standby time between the accesses. The longer the standby time is, the greater the amount of reduction of the performance of the memory system 1 becomes.

In yet another example, if a plurality of access commands are sequentially executed, the memory controller 10 inserts a standby time during execution of the access command. For example, the memory controller 10 transmits a response corresponding to the access command to the host 2 after lapse of time set as the standby time from completion of the processing corresponding to one access command. The longer the standby time is, the greater the amount of reduction of the performance of the memory system 1 becomes.

The memory controller 10 may change the amount of reduction of the performance of the memory system 1 using only one method or may adjust the amount of reduction of the performance of the memory system 1 by a combination of a plurality of methods. For example, the memory controller 10 first reduces the performance of the memory system 1 by reducing the number of parallel operations of the NAND memory 20. If the number of parallel operations of the NAND memory 20 is reduced and the amount of reduction is required to be further increased, the memory controller 10 lowers the frequency of the clock supplied to the NAND memory 20 or the memory controller 10.

Hereinafter, the amount of reduction of the performance of the memory system 1 is referred to as a throttling level. The greater the level value of the throttling level is, the greater the amount of reduction of the performance of the memory system 1 is. Hereinafter, unless otherwise specified, it is assumed that the number of commands means the number of access commands stored in the command queue 131.

Figure 3:
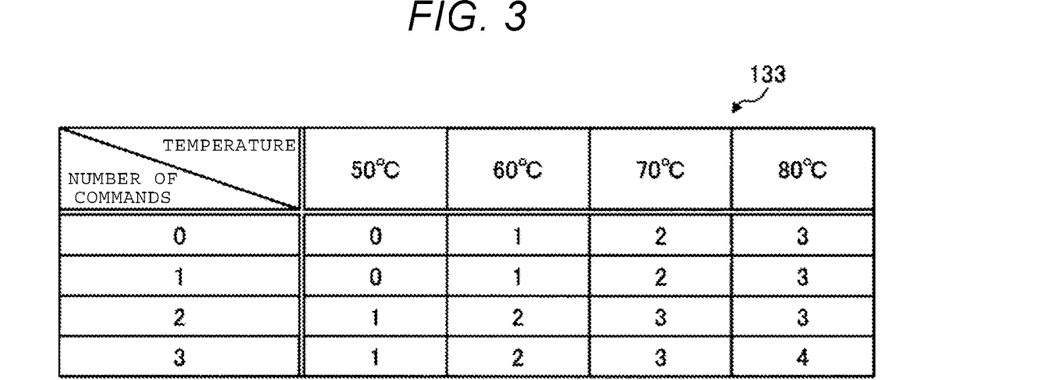
FIG. 3 is an example of a data structure for throttling level information used in the first embodiment.

A relationship between the number of commands, the temperature of the memory system 1, and the throttling level is defined in the throttling level information 133. FIG. 3 is an example of a data structure for the throttling level information 133. In the example of the present figure, the throttling level information 133 has a table structure. The CPU 11 selects one of a plurality of rows of the table, based on the number of commands. In addition, the CPU 11 selects one of the plurality of columns of the table, based on a temperature detected by the temperature sensor 40. The CPU 11 sets a level value recorded in a cell at an intersection between the selected row and the selected column as a throttling level, and reduces performance according to the set level value.

Under a condition that the detected temperatures are the same, the throttling level information 133 is set such that, when the number of commands is small, a level value smaller than when the number of commands is large can be acquired. According to the example illustrated in FIG. 3, for example, when the detected temperature is 60° C. and the number of commands is 0 or 1, the level value of the corresponding throttling level is 1. In addition, when the detected temperature is 60° C. and the number of commands is 2 or 3, the level value of the corresponding throttling level is 2.

In addition, under a condition that the number of commands is the same, the throttling level information 133 is set such that, when the detected temperature is high, a level value larger than when the detected temperature is low can be acquired. For example, when the number of commands is 2 and the detected temperature is 50° C., a level value of the corresponding throttling level is 1. In addition, when the number of commands is 2 and the detected temperature is 60° C., the level value of the corresponding throttling level is 2.

Figure 4:
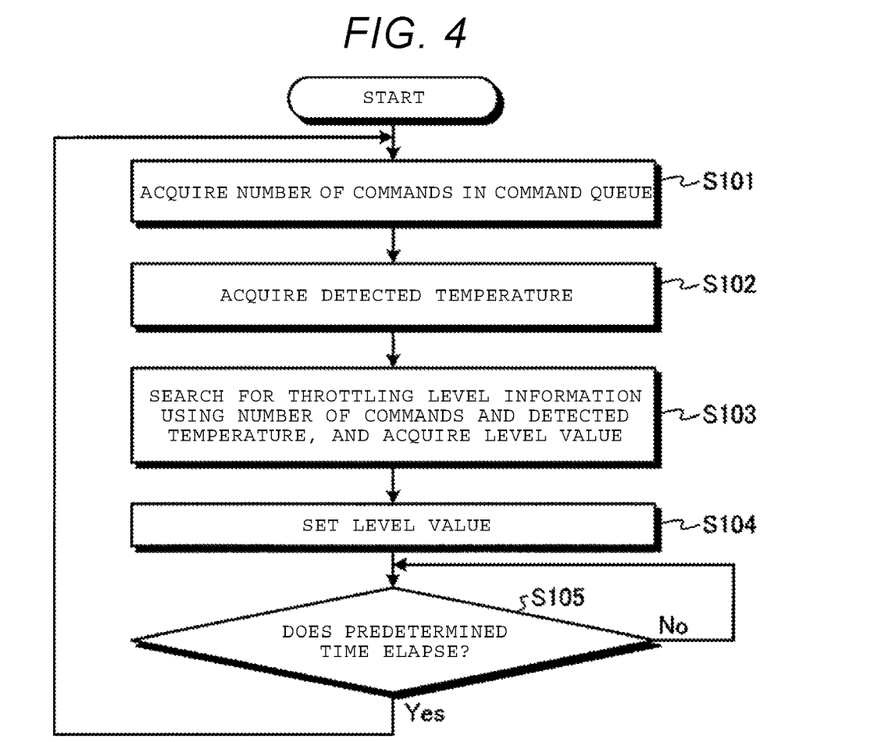
FIG. 4 is a flowchart illustrating an operation of the memory system according to the first embodiment.

Subsequently, an operation of the memory system 1 according to the first embodiment will be described. FIG. 4 is a flowchart illustrating the operation of the memory system 1 according to the first embodiment. Here, description is made in which the CPU 11 is performing each processing illustrated in FIG. 4.

First, the CPU 11 acquires the number of commands in the command queue 131 by referring to the command queue 131 (S101). In addition, the CPU 11 acquires a temperature detected by the temperature sensor 40 (S102). Then, the CPU 11 searches for the throttling level information 133 using the acquired number of commands and the detected temperature, and acquires a level value from the throttling level information 133 (S103).

Subsequently, the CPU 11 sets the acquired level value as a setting value of the throttling level (S104). The CPU 11 controls performance of the memory system 1, according to a set level value.

For example, the memory controller 10 stores control parameters in advance for each level value. The control parameters affect performance and include, for example, a setting value of a clock frequency, a setting value of a parallel operation number, a setting value of a standby time inserted between accesses to the NAND memory 20, a setting value of a standby time inserted between the accesses to the host 2, or a combination thereof. The memory controller 10 performs control according to the control parameters associated with the set level value, thereby controlling the performance of the memory system 1 in a manner corresponding to the set level value.

The CPU 11 determines whether or not a predetermined time, which in one embodiment is user defined, elapses (S105) after the processing of S104 (that is, after the control corresponding to the set level value starts). If the predetermined time does not elapse (S105, No), the CPU 11 performs processing of S105 again. If the predetermined time elapses (S105, Yes), the CPU 11 performs the processing of S101 again.

In the above description, the number of commands stored in the command queue 131 is used as information indicating a status of reception of the commands. The information indicating the status of reception of the commands is not limited to this. For example, the number of access commands received from the host 2 per unit time (in other words, the reception frequency of access commands) can be used as information indicating the status of reception of the commands. In another example, a moving average of the number of commands stored in the command queue 131 for a predetermined period can be used as information indicating a status of reception of commands.

In addition, description is made in which the throttling level information 133 has a table structure. A data structure for the throttling level information 133 is not limited to the table. The throttling level information 133 may be configured as a function that defines a relationship between the status of reception of the command, the temperature of the memory system 1, and the throttling level.

In addition, description is made in which the operation of FIG. 4 is performed by the CPU 11. Some or all of the operations of FIG. 4 may be performed by a dedicated hardware circuit.

In addition, in the description of FIG. 4, the CPU 11 performs the processing of S101 again, according to the elapsed time after a control corresponding to the set level value starts. Instead, the CPU 11 may perform the processing of S101, according to the number of commands processed after the control corresponding to the set level value starts, instead of waiting for a predetermined amount of time.

As described above, according to the first embodiment, the memory controller 10 acquires a status of reception of commands and a temperature detected by the temperature sensor 40, and controls performance of the memory system 1 in accordance with the acquired status and the detected temperature.

Thus, for example, in a case where it is expected that a temperature of the memory system 1 decrease even if the performance is not strongly reduced, such as a case where the number of commands to be executed is small, the memory controller 10 can reduce the amount of reduction of the performance of the memory system 1. Thereby, latency is prevented from being excessively deteriorated, and performance of the memory system 1 is improved.

According to the first embodiment, the memory controller 10 uses the number of commands stored in the command queue 131 as information indicating a status of reception of commands. Thus, the memory controller 10 can acquire a numerical value as information indicating the status of reception of commands by using a simple algorithm. As described above, the information indicating the status of reception of commands is not limited to the number of commands stored in the command queue 131.

In addition, according to the first embodiment, in a first case where the number of commands stored in the command queue 131 is a first value, the memory controller 10 reduces the amount of reduction of the performance of the memory system 1, compared with a second case where a temperature detected by the temperature sensor 40 is the same as the temperature in the first case and the number of commands stored in the command queue 131 is a second value larger than the first value. Thereby, latency is prevented from being excessively deteriorated.

In addition, according to the first embodiment, in a third case where the detected temperature is a third value, the memory controller 10 increases the amount of reduction of the performance of the memory system 1, compared with a fourth case where the number of commands stored in the command queue 131 is the same as in the third case and the detected temperature is a fourth value smaller than the third value. Thereby, as the temperature of the memory system 1 is higher, the memory controller 10 can perform feedback for preventing an increase in temperature.

Second Embodiment

Here, points different from the first embodiment will be mainly described. In a second embodiment, the memory controller 10 stores a target temperature. If a temperature of the memory system 1 does not decrease to the target temperature as in spite of reducing performance according to a level value, the memory controller 10 reduces performance of the memory system 1 to a greater amount by updating the throttling level information 133. The memory controller 10 can update a relationship between a status of reception of commands, the temperature of the memory system 1, and a throttling level, which are defined in the throttling level information 133.

Figure 5:
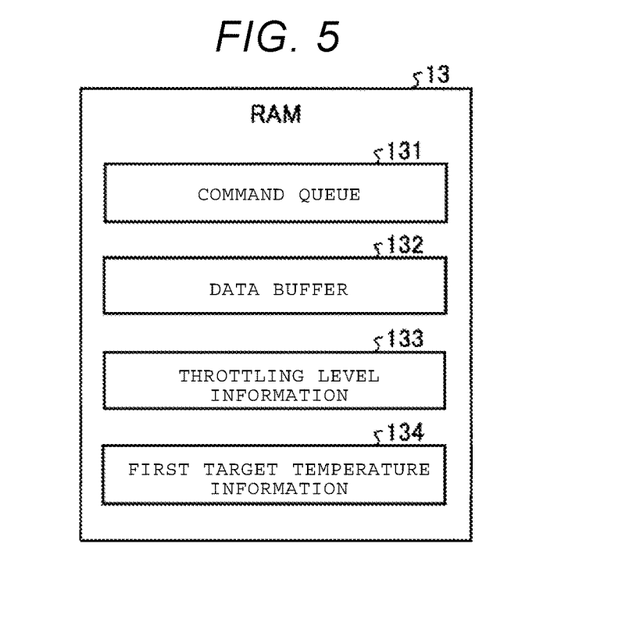
FIG. 5 is a diagram illustrating a configuration of a RAM in a memory system according to a second embodiment.

FIG. 5 is a diagram illustrating a configuration of the RAM 13 in a memory system according to the second embodiment. As illustrated in the present figure, the RAM 13 includes the command queue 131 and the data buffer 132. In addition, the RAM 13 includes the throttling level information 133 and first target temperature information 134.

Figure 6:
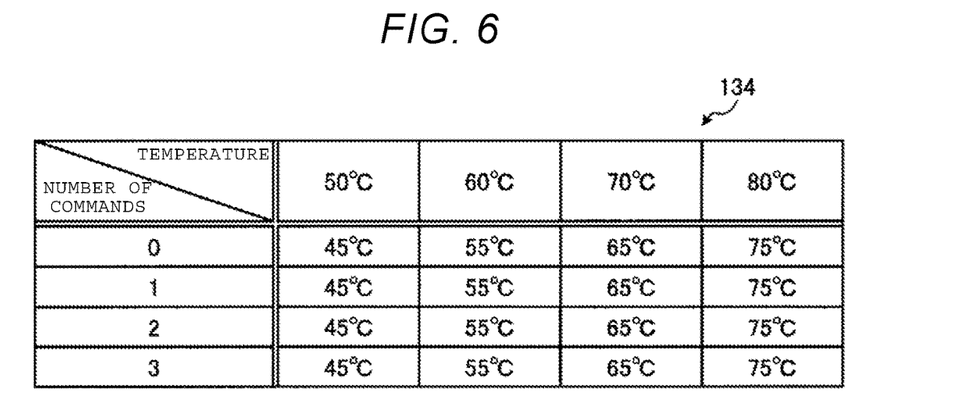
FIG. 6 is an example of a data structure for first target temperature information used in the second embodiment.

FIG. 6 is an example of a data structure for the first target temperature information 134 according to the second embodiment. In the example illustrated in the present figure, the first target temperature information 134 has a table structure. The CPU 11 selects one of a plurality of rows of the table, according to the number of commands. In addition, the CPU 11 selects one of the plurality of columns of the table, based on a temperature detected by the temperature sensor 40. The CPU 11 uses a numerical value recorded in a cell at an intersection between the selected row and the selected column as a target temperature.

According to the example illustrated in FIG. 6, for example, if the detected temperature is 50° C., 45° C. is used as the target temperature. If the detected temperature is 60° C., 55° C. is used as the target temperature. If the detected temperature is 70° C., 65° C. is used as the target temperature. If the detected temperature is 80° C., 75° C. is used as the target temperature. In the example of FIG. 6, the target temperature does not depend on the number of commands. However, in other examples, the first target temperature information 134 may be set such that the target temperature varies depending on the number of commands.

Figure 7:
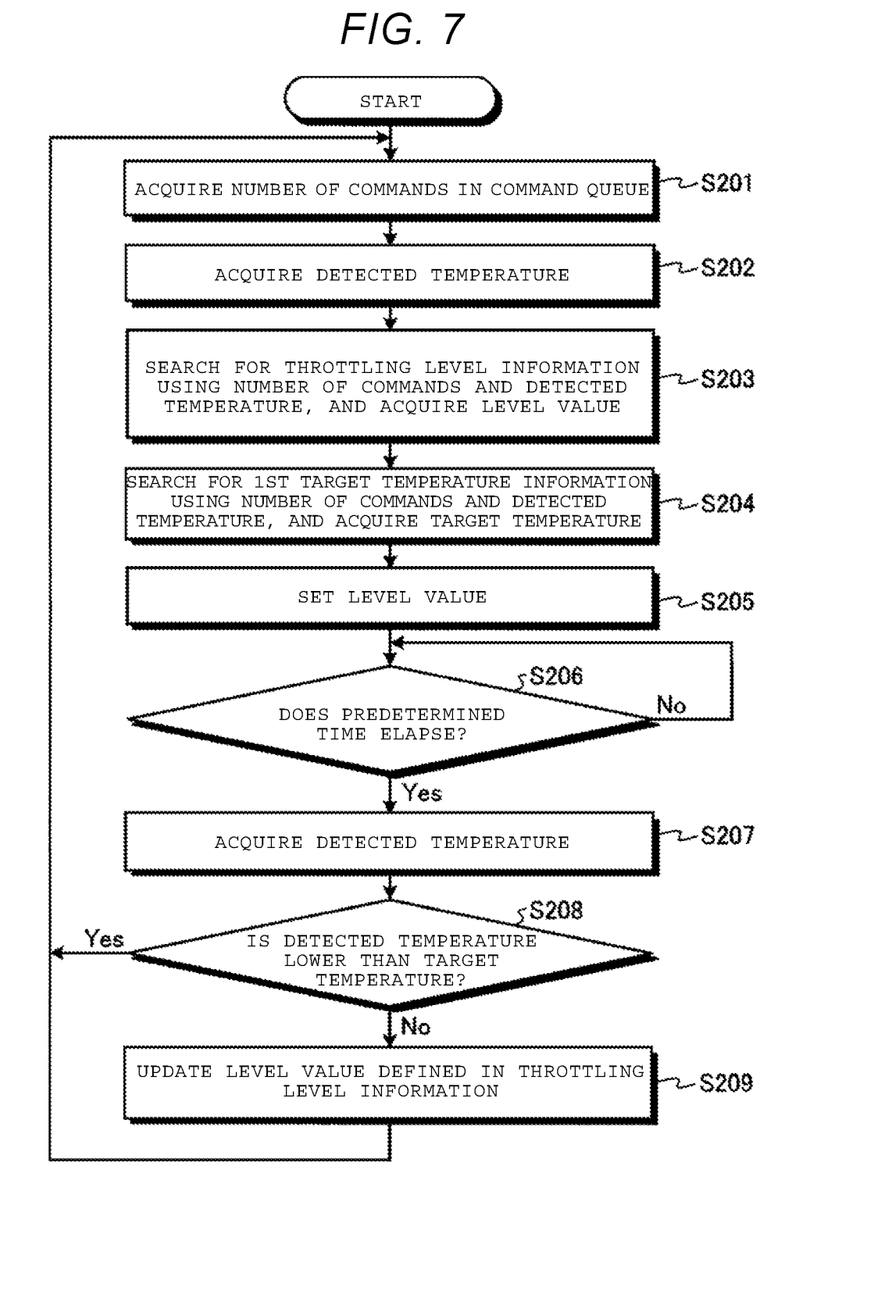
FIG. 7 is a flowchart illustrating an operation of the memory system according to the second embodiment.

FIG. 7 is a flowchart illustrating an operation of the memory system 1 according to the second embodiment.

First, the CPU 11 acquires the number of commands in the command queue 131 by referring to the command queue 131 (S201). In addition, the CPU 11 acquires the temperature detected by the temperature sensor 40 (S202). Then, the CPU 11 searches for the throttling level information 133 using the acquired number of commands and the detected temperature, and acquires a level value from the throttling level information 133 (S203). In addition, the CPU 11 searches for the first target temperature information 134 using the acquired number of commands and the detected temperature, and acquires a target temperature from the first target temperature information 134 (S204).

Subsequently, the CPU 11 sets the acquired level value as a setting value of a throttling level (S205). The CPU 11 controls performance of the memory system 1, according to the set level value.

The CPU 11 determines whether or not a predetermined time elapses (S206) after the processing of S205 (that is, after a control corresponding to the set level value starts). If the predetermined time does not elapse (S206, No), the CPU 11 performs the processing of S206 again.

If the predetermined time elapses (S206, Yes), the CPU 11 acquires the temperature detected by the temperature sensor 40 again (S207). Then, the CPU 11 determines whether or not the detected temperature is lower than the target temperature (S208). If the detected temperature is not lower than the target temperature (S208, No), the CPU 11 overwrites a level value in the throttling level information 133 corresponding to a condition used for the search in the processing of S203 with a value larger by 1 (S209).

If the detected temperature is lower than the target temperature (S208, Yes), or after S209, the CPU 11 performs the processing of S201 again.

For example, if a condition at the time of searching for the throttling level information 133 includes a detected temperature of 70° C. and is the number of commands of 1, a level value corresponding to the condition is 2, according to the example of FIG. 3. In addition, the target temperature under the same condition is 65° C., according to the example of FIG. 6. If the temperature of the memory system 1 does not decrease below 65° C. after the throttling level is set to 2, the CPU 11 updates, for example, the level value corresponding to the same condition from 2 to 3 in S209. Thereby, thereafter, in the same condition, 3 is set as the throttling level. That is, the amount of reduction of the performance of the memory system 1 is increased.

In the above description, the CPU 11 updates a level value defined in the throttling level information 133 to a value larger by 1 than the current value. The CPU 11 may update the level value to a value larger by 2 or more than the current value.

In the above description, if the detected temperature is equal to the target temperature, the CPU 11 proceeds to the processing of S209. Processing of a case where the detected temperature is equal to the target temperature is not limited to this. The CPU 11 may proceed to the processing of S201.

As described above, according to the second embodiment, the memory controller 10 reduces the performance of the memory system 1 to a first level value acquired from the throttling level information 133 and thereafter, acquires the detected temperature again. If the detected temperature acquired again is higher than the target temperature, the memory controller 10 updates the throttling level information 133 such that the same condition corresponds to a second level value larger than the first level value.

By using the configuration, the memory system 1 can change a method of setting the throttling level depending on a relationship between a level value set in the past and results at the time of setting the level value. It is possible to more reliably prevent a temperature of the memory system 1 from becoming too high, and thus, performance of the memory system 1 is further improved.

Third Embodiment

In the second embodiment, the memory controller 10 updates the throttling level information 133, according to whether or not the detected temperature decreases below a target temperature after reduction of performance starts. A rule to update the throttling level information 133 is not limited to this. In a third embodiment, an example of update rules different from the update rule in the second embodiment will be described. Here, points different from the second embodiment will be mainly described, and the other points will be omitted.

Figure 8:
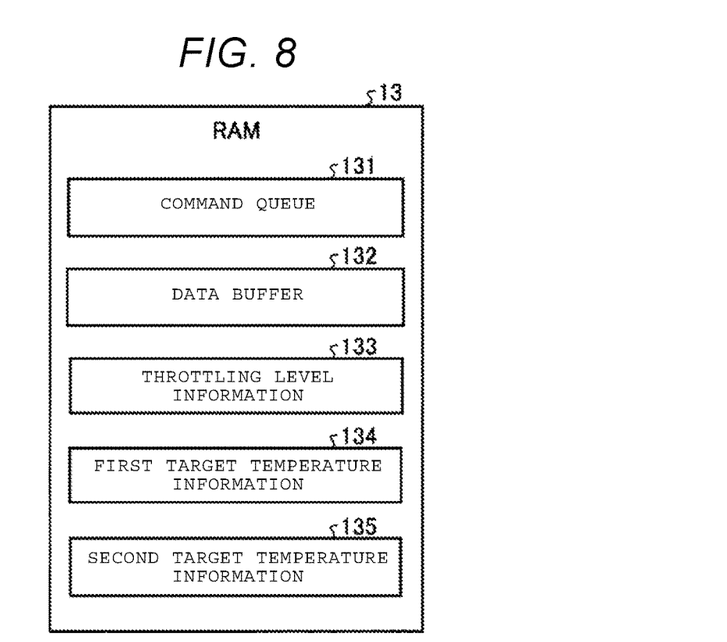
FIG. 8 is a diagram illustrating a configuration of a RAM in a memory system according to a third embodiment.

FIG. 8 is a diagram illustrating a configuration of the RAM 13 in a memory system according to the third embodiment. As illustrated in the present figure, the RAM 13 includes the command queue 131 and the data buffer 132. In addition, the RAM 13 stores the throttling level information 133, the first target temperature information 134, and second target temperature information 135.

In the third embodiment, if a detected temperature is higher than a target temperature range after reduction of performance starts, the memory controller 10 updates a level value defined in the throttling level information 133 to a larger value. In addition, if the detected temperature is lower than the target temperature range after the reduction of performance starts, the memory controller 10 updates the level value defined in the throttling level information 133 to a smaller value.

Figure 9:
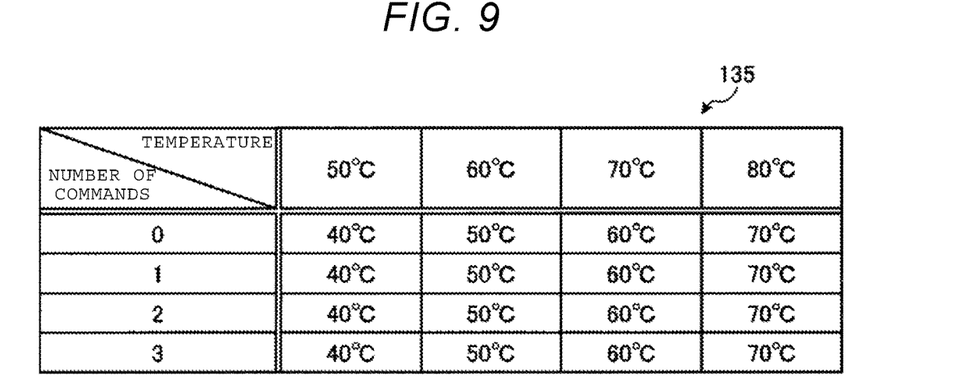
FIG. 9 is an example of a data structure for second target temperature information used in the third embodiment.

The second target temperature information 135 is for determining a lower limit value of the target temperature range. FIG. 9 is an example of a data structure for the second target temperature information 135. In the example illustrated in the present figure, the second target temperature information 135 has a table structure. The CPU 11 selects one of a plurality of rows of the table, according to the number of commands. In addition, the CPU 11 selects one of the plurality of columns of the table, based on a temperature detected by the temperature sensor 40. The CPU 11 uses a numerical value recorded in the cell at an intersection between the selected row and the selected column as a lower limit value of the target temperature range (hereinafter, a lower limit value of the target temperature).

According to the example illustrated in FIG. 9, for example, if a detected temperature is 50° C., 40° C. is used as the lower limit value of the target temperature. If the detected temperature is 60° C., 50° C. is used as the lower limit value of the target temperature. If the detected temperature is 70° C., 60° C. is used as the lower limit value of the target temperature. If the detected temperature is 80° C., 70° C. is used as the lower limit value of the target temperature. In the example of FIG. 9, the lower limit value of a target temperature does not depend on the number of commands. However, in other examples, the second target temperature information 135 may be set so that the target temperature lower limit value changes according to the number of commands.

The CPU 11 uses a temperature recorded in the first target temperature information 134 as an upper limit value of the target temperature range (hereinafter, referred to as an upper limit value of the target temperature). The first target temperature information 134 has, for example, a data structure illustrated in FIG. 6. The first target temperature information 134 and the second target temperature information 135 are set such that, under the same condition, the lower limit value of the target temperature searched from the second target temperature information 135 is set to be smaller than the upper limit value of the target temperature searched from the first target temperature information 134.

Figure 10:
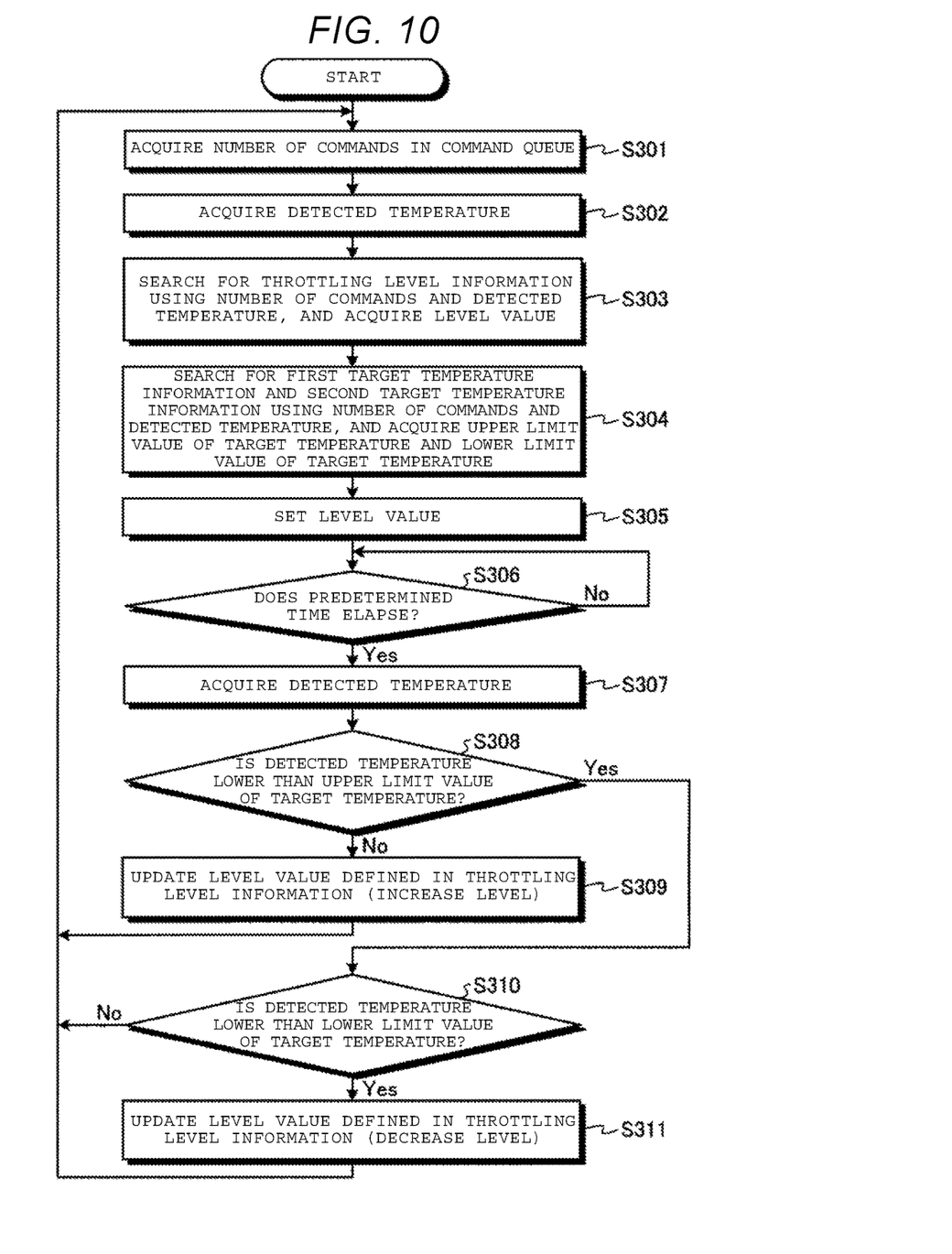
FIG. 10 is a flowchart illustrating an operation of the memory system according to the third embodiment.

FIG. 10 is a flowchart illustrating an operation of the memory system 1 according to the third embodiment.

First, the CPU 11 acquires the number of commands in the command queue 131 by referring to the command queue 131 (S301). In addition, the CPU 11 acquires a temperature detected by the temperature sensor 40 (S302). Then, the CPU 11 searches for the throttling level information 133 using the acquired number of commands and the detected temperature, and acquires a level value from the throttling level information 133 (S303). In addition, the CPU 11 searches for the first target temperature information 134 and the second target temperature information 135 using the acquired number of commands and the detected temperature, and acquires an upper limit value of a target temperature from the first target temperature information 134 and a lower limit value of the target temperature from the second target temperature information 135 (S304).

Subsequently, the CPU 11 sets an acquired level value as a setting value of a throttling level (S305). The CPU 11 controls performance of the memory system 1, according to the set level value.

In step S306, the CPU 11 determines whether or not a predetermined period of time has elapsed after the processing in step S305 (that is, after the control corresponding to the set level value is started). When the predetermined time has not elapsed (S306, No), the CPU 11 executes the processing of S306 again.

If a predetermined time elapses (S306, Yes), the CPU 11 acquires the temperature detected by the temperature sensor 40 again (S307). Then, the CPU 11 determines whether or not the detected temperature is lower than the upper limit value of the target temperature (S308). If the detected temperature is not lower than the upper limit value of the target temperature (S308, No), the CPU 11 overwrites a level value corresponding to a condition used for searching for the throttling level information 133 with a value larger by 1 in the processing of S303 (S309).

If the detected temperature is lower than the upper limit value of the target temperature (S308, Yes), the CPU 11 determines whether or not the detected temperature is lower than the lower limit value of the target temperature (S310). If the detected temperature is lower than the lower limit value of the target temperature (S310, Yes), the CPU 11 overwrites a level value corresponding to the condition used for searching the throttling level information 133 with a value smaller by 1 in the processing of S303 (S311).

After S309, or if the detected temperature is not lower than the lower limit value of the target temperature (S310, No), or after S311, the CPU 11 performs the processing of S301 again.

In the above description, the CPU 11 adds 1 to, or subtracts 1 from, the level value defined in the throttling level information 133. However, in other examples, the amount of change of the level value may be 2 or more.

In addition, in the above description, if the detected temperature is equal to the upper limit value of the target temperature, the CPU 11 proceeds to the processing of S309. Processing of case where the detected temperature is equal to the upper limit value of the target temperature is not limited to this. The CPU 11 may proceed to the processing of S310.

In addition, if the detected temperature is equal to the lower limit value of the target temperature, the CPU 11 proceeds to the processing of S301. Processing of a case where the detected temperature is equal to the lower limit value of the target temperature is not limited to this. The CPU 11 may proceed to the processing of S311.

As described above, according to the third embodiment, the memory controller 10 reduces performance of the memory system 1 to a first level value acquired from the throttling level information 133, and thereafter, acquires the detected temperature again. If the detected temperature acquired again is lower than the lower limit value of the target temperature range, the memory controller 10 updates the throttling level information 133 such that a throttling level in the same condition corresponds to a second level value smaller than the first level value.

By using the configuration, the memory system 1 can change a method of setting a throttling level depending on a relationship between a level value set in the past and results at the time of setting the level value. It is possible to prevent performance of the memory system 1 from being excessively reduced, and thus, performance of the memory system 1 is further improved.

Fourth Embodiment

Here, points different from the first embodiment will be mainly described.

Access to a memory cell array is a main cause of heat generation in the NAND memory 20. Therefore, in a fourth embodiment, among commands stored in the command queue 131, a command is determined which requires an access to the memory cell array, that is, an access to the NAND memory 20, and the number of determined commands is used as information indicating a status of reception of the commands. Hereinafter, a command determined as a command requiring an access to the NAND memory 20 is referred to as a target command.

Figure 11:
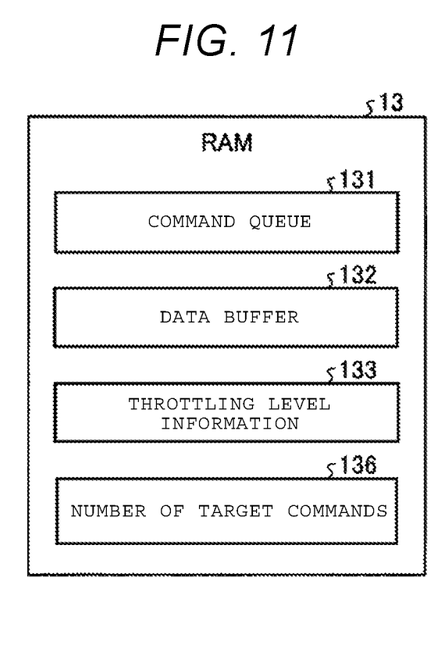
FIG. 11 is a diagram illustrating a configuration of a RAM in a memory system according to a fourth embodiment.

FIG. 11 is a diagram illustrating a configuration of the RAM 13 in a memory system according to the fourth embodiment. As illustrated in the present figure, the RAM 13 includes the command queue 131 and the data buffer 132. In addition, the RAM 13 includes the throttling level information 133 and a target command number 136.

Figure 12:
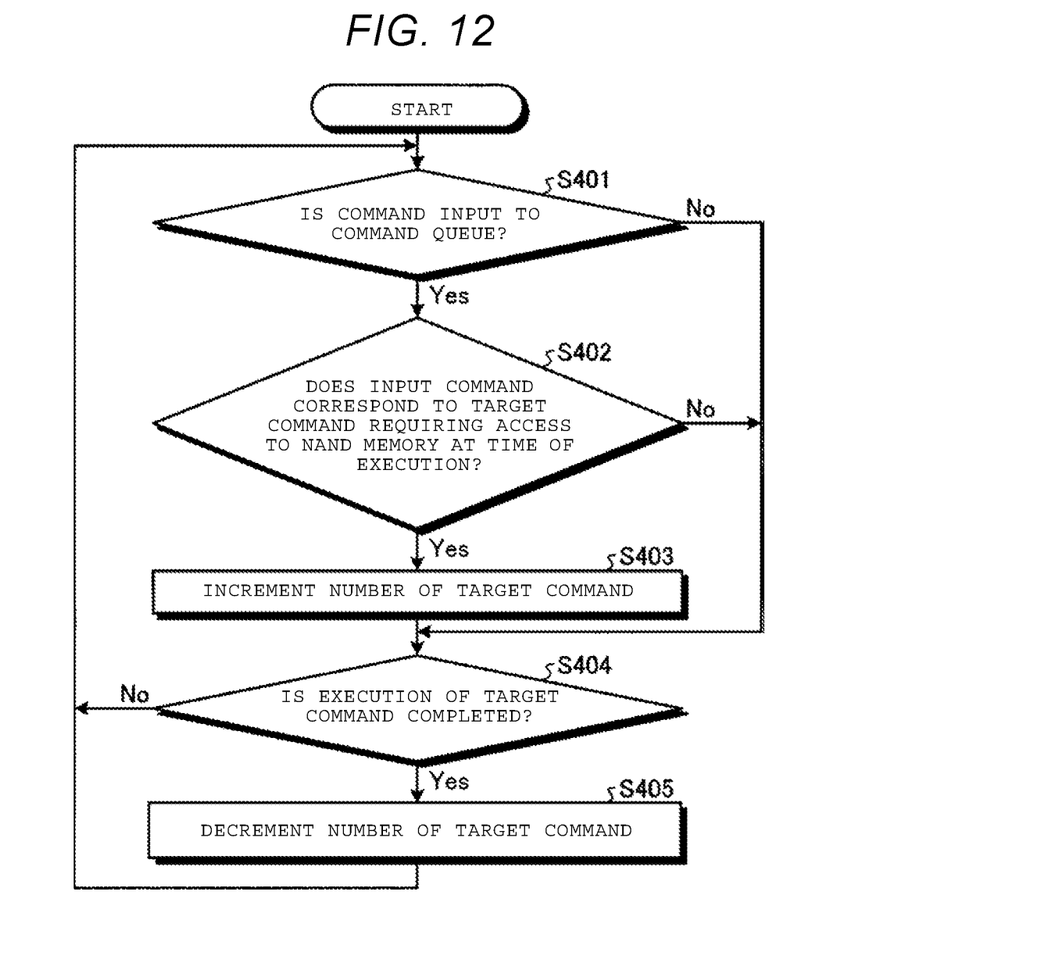
FIG. 12 is a flowchart illustrating an operation of monitoring the number of target commands, according to the fourth embodiment.

FIG. 12 is a flowchart illustrating an operation of monitoring the number of target commands according to the fourth embodiment. The CPU 11 determines whether or not a new command is input to the command queue 131 (S401). If a new command is input to the command queue 131 (S401, Yes), the CPU 11, in S402, determines whether or not the command corresponds to a command requiring an access to the NAND memory 20 (i.e., target command).

Whether or not the command corresponds to the target command can be determined by any technically feasible method.

For example, if data designated as a read target by a read command is stored in the data buffer 132 at the time of executing the read command, the CPU 11 can send the data from the data buffer 132 to the host 2. That is, the read command does not require an access to the NAND memory 20. In contrast to this, if the data designated as the read target by the read command is not stored in the data buffer 132 at the time of executing the read command, the CPU 11 requires reading the data from the NAND memory 20. That is, the read command corresponds to a target command.

In S402, for example, if a read command is stored in the command queue 131, the CPU 11 determines whether or not the data designated as a read target by the read command is stored in the data buffer 132 at the time of executing the read command, based on the order of execution of each command stored in the command queue 131. If the data designated as the read target by the read command is stored in the data buffer 132 at the time of executing the read command, the CPU 11 does not regard the read command as the target command. If the data designated as the read target by the read command is not stored in the data buffer 132 at the time of executing the read command, the CPU 11 regards the read command as the target command.

The above-described method of specifying the target command is an example. For example, if a read command is stored in the command queue 131, the CPU 11 may determine whether or not the read command corresponds to a target command, based on whether or not the data designated as a read target by the read command is stored at the time of executing S402.

If a command which is newly added to the command queue 131 corresponds to the target command (S402, Yes), the CPU 11 increments the target command number 136 (S403). The CPU 11 adds 1 to the target command number 136 and updates the target command number 136 in the RAM 13 with a value obtained by the addition.

If the command which is newly added to the command queue 131 does not correspond to the target command (S402, No), the CPU 11 skips S403.

If no command is newly input to the command queue 131 (S401, No), or if the command which is newly added to the command queue 131 does not correspond to the target command (S402, No), or after S403, the CPU 11 determines whether or not execution of the target command is completed (S404).

For example, the CPU 11 stores the command specified as the target command in S402 using a list, a flag, or the like. Then, if completion of the execution of the command is detected in S404, the CPU 11 determines whether or not the command corresponds to the target command, based on the list, the flag, or the like. The method of determining whether or not execution of the target command is completed is not limited to this.

If execution of the target command is completed (S404, Yes), the CPU 11 decrements the target command number 136 (S405). The CPU 11 subtracts 1 from the target command number 136 and updates the target command number 136 in the RAM 13 with a value obtained by the subtraction.

If execution of the target command is not completed (S404, No), the CPU 11 skips S405. If execution of the target command is not completed (S404, No), or after S405, the CPU 11 executes S401 again.

As such, the CPU 11 monitors the number of target commands stored in the command queue 131.

Figure 13:
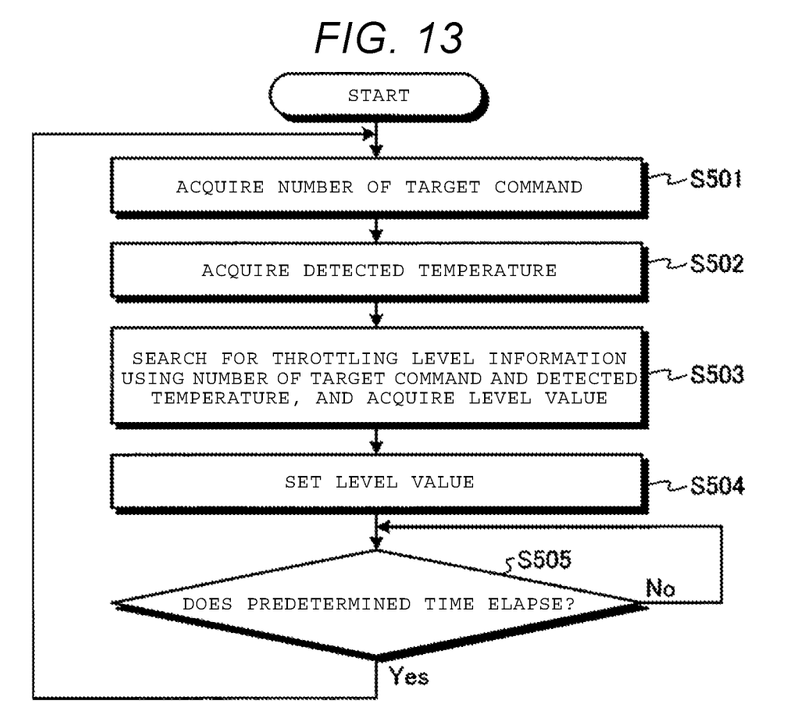
FIG. 13 is a flowchart illustrating an operation of controlling performance of the memory system, according to the fourth embodiment.

FIG. 13 is a flowchart illustrating an operation of controlling performance of the memory system 1 according to the fourth embodiment.

First, the CPU 11 acquires the target command number 136 from the RAM 13 (S501). In addition, the CPU 11 acquires a temperature detected by the temperature sensor 40 (S502). Then, the CPU 11 searches for the throttling level information 133 using the acquired target command number 136 and the detected temperature, and acquires a level value from the throttling level information 133 (S503). In the fourth embodiment, the CPU 11 selects a column of the throttling level information 133 based on the target command number 136.

Subsequently, the CPU 11 sets the acquired level value as a setting value of a throttling level (S504). The CPU 11 controls performance of the memory system 1, according to the set level value. The CPU 11 determines whether or not a predetermined time elapses after S504 (that is, after a control corresponding to the set level value starts) (S505). If the predetermined time does not elapse (S505, No), the CPU 11 executes the determination processing of S505 again. If the predetermined time elapses (S505, Yes), the CPU 11 executes the processing of S501 again.

As described above, according to the fourth embodiment, the memory controller 10 uses the number of commands requiring an access to the NAND memory 20 (that is, target commands), among all the commands stored in the command queue 131, as information indicating a status of reception of the commands. Thereby, the memory controller 10 can determine a throttling level except for the commands that do not affect the heat generation of the NAND memory 20, and thus, it is possible to prevent performance of the memory system 1 from being reduced more than necessary.

In one example, if data designated as a read target by a read command is stored in the data buffer 132, the memory controller 10 does not regard the read command as a target command. In addition, if data designated as the read target by the read command is not stored in the data buffer 132, the memory controller 10 regards the read command as the target command. Thus, it is possible to determine whether or not the read command corresponds to the target command among read commands.

Here, an example in which the fourth embodiment is applied to the memory system 1 according to the first embodiment has been described. The fourth embodiment can be applied to the memory system 1 according to the second and third embodiments.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A memory system comprising:
   a nonvolatile memory;
   a temperature sensor; and
   a controller configured to acquire a number of target commands that are queued for execution and a temperature detected by the temperature sensor, and set control parameters that affect performance of the memory system according to the acquired number of target commands and the acquired temperature.

2. The memory system according to claim 1, further comprising:
   a command queue in which pending commands are stored, wherein the number of target commands equal the number of pending commands.

3. The memory system according to claim 1, further comprising:
   a command queue in which pending commands are stored, wherein the number target commands is less than the number of pending commands.

4. The memory system according to claim 3, wherein the controller includes a data buffer in which the controller caches data stored in the nonvolatile memory, and at least one of the pending commands is a read command that targets data cached in the data buffer.

5. The memory system according to claim 1, wherein
   the control parameters are set to a first set of control parameters when the acquired number of target commands is a first number and the acquired temperature is a first temperature, and
   the control parameters are set to a second set of control parameters that reduce the performance of the memory system more than the first set of control parameters when the acquired number of target commands is a second number equal to the first number and the acquired temperature is a second temperature that is higher than the first temperature.

6. The memory system according to claim 1, wherein
   the control parameters are set to a first set of control parameters when the acquired number of target commands is a first number and the acquired temperature is a first temperature, and
   the control parameters are set to a second set of control parameters that reduce the performance of the memory system more than the first set of control parameters when the acquired number of target commands is a second number larger than the first number and the acquired temperature is a second temperature that is equal to the first temperature.

7. The memory system according to claim 1, wherein
   the controller is configured to acquire a second temperature detected by the temperature sensor a predetermined time after having set the control parameters according to the acquired number of target commands and the acquired temperature, and change the control parameters if the second temperature is above a first threshold temperature or below a second threshold temperature, the first threshold temperature being larger than the second threshold temperature.

8. The memory system according to claim 7, wherein
   the controller is configured to change the control parameters to reduce performance of the memory system more than the currently set control parameters if the second temperature is above the first threshold temperature, and to change the control parameters to reduce performance of the memory system less than the currently set control parameters if the second temperature is below the second threshold temperature.

9. The memory system according to claim 8, wherein
   the controller is configured to not change the control parameters if the second temperature is between the first threshold temperature and the second threshold temperature.

10. The memory system according to claim 1, wherein the temperature sensor is positioned to detect a temperature of the nonvolatile memory.

11. The memory system according to claim 1, wherein the temperature sensor is positioned to detect a temperature of the controller.

12. A method of setting performance levels of a memory system including a nonvolatile memory, comprising:
    determining a number of target commands that are queued for execution by the memory system for reading from and writing to the nonvolatile memory;
    detecting a temperature within the memory system; and
    setting control parameters of the memory system that affect performance of the memory system according to the number of target commands and the detected temperature.

13. The method according to claim 12, wherein the target commands that are queued for execution include read commands for data that are stored in the nonvolatile memory and are not cached.

14. The method according to claim 12, wherein
    the control parameters are set to a first set of control parameters when the number of target commands is a first number and the detected temperature is a first temperature, and
    the control parameters are set to a second set of control parameters that reduce the performance of the memory system more than the first set of control parameters when the number of target commands is a second number equal to the first number and the detected temperature is a second temperature that is higher than the first temperature.

15. The method according to claim 12, wherein
    the control parameters are set to a first set of control parameters when the number of target commands is a first number and the detected temperature is a first temperature, and
    the control parameters are set to a second set of control parameters that reduce the performance of the memory system more than the first set of control parameters when the number of target commands is a second number larger than the first number and the detected temperature is a second temperature that is equal to the first temperature.

16. The method according to claim 12, further comprising:

detecting a second temperature a predetermined time after having set the control parameters according to the number of target commands and the detected temperature; and changing the control parameters if the second temperature is above a first threshold temperature or below a second threshold temperature, the first threshold temperature being larger than the second threshold temperature.

17. The method according to claim 16, further comprising:

changing the control parameters to reduce performance of the memory system more than the currently set control parameters if the second temperature is above the first threshold temperature; and changing the control parameters to reduce performance of the memory system less than the currently set control parameters if the second temperature is below the second threshold temperature.

18. The method according to claim 17, wherein the control parameters are not changed if the second temperature is between the first threshold temperature and the second threshold temperature.

19. The method according to claim 12, wherein a temperature of the nonvolatile memory is detected.

20. The method according to claim 12, wherein a temperature of a controller that executes the reading from and writing to the nonvolatile memory, is detected.

* * * * *